United States Patent
Detro (10) Patent No.: US 7,006,297 B2
(45) Date of Patent: Feb. 28, 2006

(54) PATHLENGTH MATCHED BEAM SPLITTER AND METHOD AND APPARATUS FOR ASSEMBLY

(75) Inventor: Michael Detro, Los Gatos, CA (US)

(73) Assignee: LightMaster Systems, Inc., Cupertino, CA (US)

( * ) Notice: Subject to any disclaimer, the term of this patent is extended or adjusted under 35 U.S.C. 154(b) by 0 days.

(21) Appl. No.: 10/939,180

(22) Filed: Sep. 10, 2004

(65) Prior Publication Data

US 2005/0030633 A1    Feb. 10, 2005

Related U.S. Application Data

(63) Continuation-in-part of application No. 10/251,225, filed on Sep. 20, 2002, now Pat. No. 6,809,874.

(60) Provisional application No. 60/349,273, filed on Jan. 14, 2002.

(51) Int. Cl.
*G02B 26/08* (2006.01)

(52) U.S. Cl. ........................ 359/629; 359/634

(58) Field of Classification Search ............... 359/629, 359/634, 638, 640; 353/34, 37, 100, 101; 348/335–339; 349/9
See application file for complete search history.

(56) References Cited

U.S. PATENT DOCUMENTS

| | | | |
|---|---|---|---|
| 4,544,237 A | 10/1985 | Gagnon | |
| 4,926,249 A | 5/1990 | Ichihara et al. | |
| 5,418,769 A | 5/1995 | Inoue | |
| 5,446,710 A * | 8/1995 | Gardner et al. | 369/44.14 |
| 5,552,922 A | 9/1996 | Magarill | |
| 5,786,937 A | 7/1998 | Chu et al. | |
| 5,838,397 A | 11/1998 | Stephens | |
| 5,865,520 A | 2/1999 | Kavanagh et al. | |
| 5,986,814 A | 11/1999 | Reinsch | |
| 6,046,858 A | 4/2000 | Scott et al. | |
| 6,113,239 A | 9/2000 | Sampsell et al. | |
| 6,115,484 A | 9/2000 | Bowker et al. | |
| 6,176,586 B1 | 1/2001 | Hirose et al. | |
| 6,183,090 B1 | 2/2001 | Nakanishi et al. | |
| 6,183,091 B1 | 2/2001 | Johnson et al. | |
| 6,262,851 B1 | 7/2001 | Marshall | |
| 6,280,037 B1 | 8/2001 | Smith | |
| 6,288,844 B1 | 9/2001 | Edlinger et al. | |
| 6,304,302 B1 | 10/2001 | Huang et al. | |
| 6,309,071 B1 | 10/2001 | Huang et al. | |
| 6,343,864 B1 | 2/2002 | Tajiri | |

(Continued)

FOREIGN PATENT DOCUMENTS

JP    54-155153    6/1981

(Continued)

*Primary Examiner*—Hung Xuan Dang
(74) *Attorney, Agent, or Firm*—John Carpenter; Reed Smith, LLP (57) ABSTRACT

Pathlength matched optical devices (such as beam splitters) are produced by viewing optical paths through the optical devices and adjusting relative positions of optical components of the optical devices until the viewed optical paths are equivalent. The optical paths begin at markings at different locations on the optical device. The optical pathlengths are equivalent when both markings are in focus in a limited field of view camera or lens. In a beam splitting cube constructed of two prisms, markings located at precisely similar locations on different prisms are pathlength matched when coincident as viewed at a reference face of the cube. The prisms are abutted at their diagonals and are adjusted by sliding the prisms along the diagonals to the pathlength matched position. Optical adhesive between the prisms is cured after fixing the prisms at the pathlength matched position.

47 Claims, 4 Drawing Sheets

U.S. PATENT DOCUMENTS

| | | |
|---|---|---|
| 6,366,335 B1 | 4/2002 | Hikmet et al. |
| 6,375,330 B1 | 4/2002 | Mihalakis |
| 6,384,972 B1 | 5/2002 | Chuang |
| 6,407,868 B1 | 6/2002 | Ishibashi et al. |
| 6,415,093 B1 | 7/2002 | Nakamura et al. |
| 6,419,362 B1 | 7/2002 | Ikeda et al. |
| 6,454,416 B1 | 9/2002 | Aoto et al. |
| 6,476,972 B1 | 11/2002 | Edlinger et al. |
| 6,490,087 B1 | 12/2002 | Fulkerson et al. |
| 6,611,379 B1 | 8/2003 | Qian et al. |
| 6,626,540 B1 | 9/2003 | Ouchi et al. |
| 6,648,474 B1 | 11/2003 | Katsumata et al. |
| 6,698,896 B1 | 3/2004 | Suzuki et al. |
| 2002/0001135 A1 | 1/2002 | Berman et al. |
| 2002/0109820 A1 | 8/2002 | Pan |
| 2002/0140905 A1 | 10/2002 | Ouchi et al. |
| 2002/0176054 A1 | 11/2002 | Mihalakis |
| 2003/0103171 A1 | 6/2003 | Hall, Jr. et al. |
| 2003/0117593 A1 | 6/2003 | Abe et al. |
| 2003/0147051 A1 | 8/2003 | Fujita et al. |
| 2003/0193652 A1 | 10/2003 | Pentico et al. |

FOREIGN PATENT DOCUMENTS

| | | |
|---|---|---|
| WO | WO 2002 04994 | 1/2002 |

* cited by examiner

PATHLENGTH MATCHED BEAM SPLITTER AND METHOD AND APPARATUS FOR ASSEMBLY

CROSS REFERENCE TO RELATED APPLICATIONS AND CLAIM OF PRIORITY

This invention is a division of Ser. No. 10/251,225 filed Sep. 20, 2002 now U.S. Pat. No. 6,808,874 which claims priority to the following co-pending U.S. provisional patent application, which is incorporated herein by reference, in its entirety:

Detro, Provisional Application Ser. No. 60/349,273, entitled "A Means of Assembling a "Pathlength Matched" PBS Cube," filed, Jan. 14, 2002.

This application also makes reference to Detro et al., U.S. patent application Ser. No. 10/202,595, entitled "METHOD AND APPARATUS FOR CONFIGURATION AND ASSEMBLY OF A VIDEO PROJECTION LIGHT MANAGEMENT SYSTEM," filed Jul. 24, 2002 the contents of which are incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to the assembly of a Beam Splitting cube and to a Polarizing Beam Splitter (PBS) cube. The present invention includes tooling and procedures that allow the assembly of PBS in which the "pathlengths" of light through the PBS are matched. The present invention provides inexpensive methods and procedures to implement pathlength matched PBS construction in high volume manufacturing environments.

2. Discussion of Background

Figure 1:
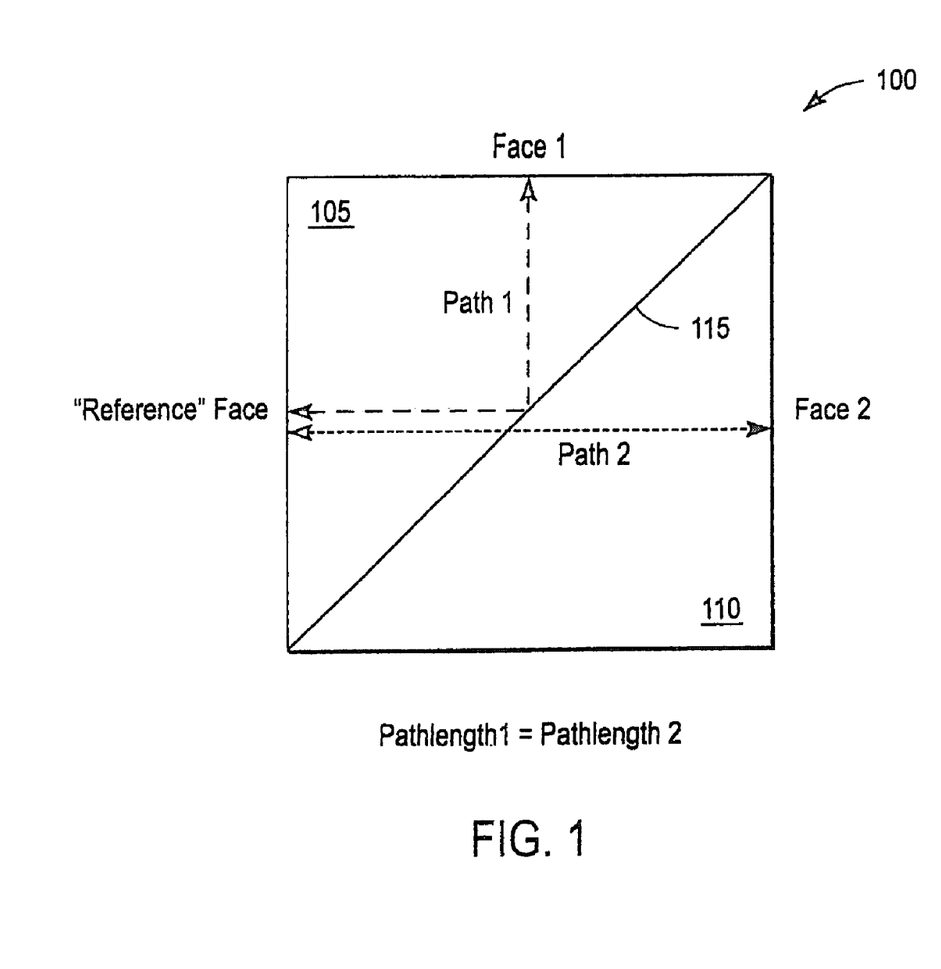
FIG. 1 is an illustration of a pathlength matched Polarizing Beam Splitter (PBS) cube.

The concept of pathlength matching is illustrated in FIG. 1 (Path 1=Path 2) in a Beam Splitting Cube 100. Beam Splitting Cube 100 is constructed of 2 optical components, an upper prism 105 and a lower prism 110. The prisms 105 and 110 are joined at a common diagonal 115. The PBS 100 has 2 illustrated paths, path 1 from a Face 1 of prism 105 to a Reference face of prism 105, and, path 2 from a Face 2 of prism 110 to the Reference face of prism 105. The illustrated paths are physical pathlengths that are substantially equal (ideally, to be exactly equal, these paths would also be on top of each other on the horizontal portion of the paths through prism 105). Hence, optical pathlengths at a given wavelength along the same paths are also substantially equal. As noted above, commercial PBS's are not usually pathlength matched. This is due to the fact that most individual prisms are not produced to a high physical tolerance and that variations are not normally accommodated in the PBS assembly process. Next, note that there are applications that use various pathlengths through an optical assembly (a PBS being one example) be matched. One example of such an optical assembly is disclosed in the above-referenced patent application entitled "METHOD AND APPARATUS FOR CONFIGURATION AND ASSEMBLY OF A VIDEO PROJECTION LIGHT MANAGEMENT SYSTEM." However, this and other optical assemblies generally require costly PBS production techniques.

In the past, two different methods have been used to produce pathlength matched PBS.

The first method is to measure the dimensions of all prism components and to sort them into groups having identical dimensions. Only prisms drawn from the same group would be mated. This method can produce a pathlength matched PBS but requires the additional labor associated with the measurements and provides additional opportunity to damage delicate prism surfaces. In addition, implementation of this method requires maintaining a substantial inventory of prism components to support high volume PBS manufacturing.

The second method is to measure the physical dimensions of the PBS during the assembly process. Then, the dimensions of the PBS are modified by adjusting a thickness of the glue line. The glue line is along the diagonal of the two prisms. In practice, this fabrication method is found to be slow, require considerable operator skill, and provides a poor yield.

SUMMARY OF THE INVENTION

The present inventors have realized that production of pathlength matched PBSs can be more economically produced by matching the optical path of prism components used in constructing the pathlength matched PBSs. The inventions disclosed herein are an improvement for assembling a pathlength matched PBS. The improvements are fast, require little operator skill and are high yielding. As a consequence, the improved means are inexpensive and appropriate for high volume production.

In one embodiment, the present invention provides a method of constructing a pathlength matched optical device, comprising the steps of, inserting an adhesive between at least two components of an optical device, adjusting positions of the components until their relative positions form a pathlength matched position, and curing the adhesive between the components while the components are held in the pathlength matched position.

In another embodiment, the present invention provides a device, comprising, a first precision holding device configured to hold a first prism and place a first alignment target adjacent to a face of the first prism, a second precision holding device configured to hold a second prism such that a diagonal of the second prism is parallel to a diagonal of the first prism and to place a second alignment target adjacent to a face of the second prism, an adjustment device configured to adjust relative positions of the first and second holding devices, and a lens configured to observe a first light path originating at the first alignment target and a second light path originating at the second alignment target.

Portions of both the device and method may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 2A:
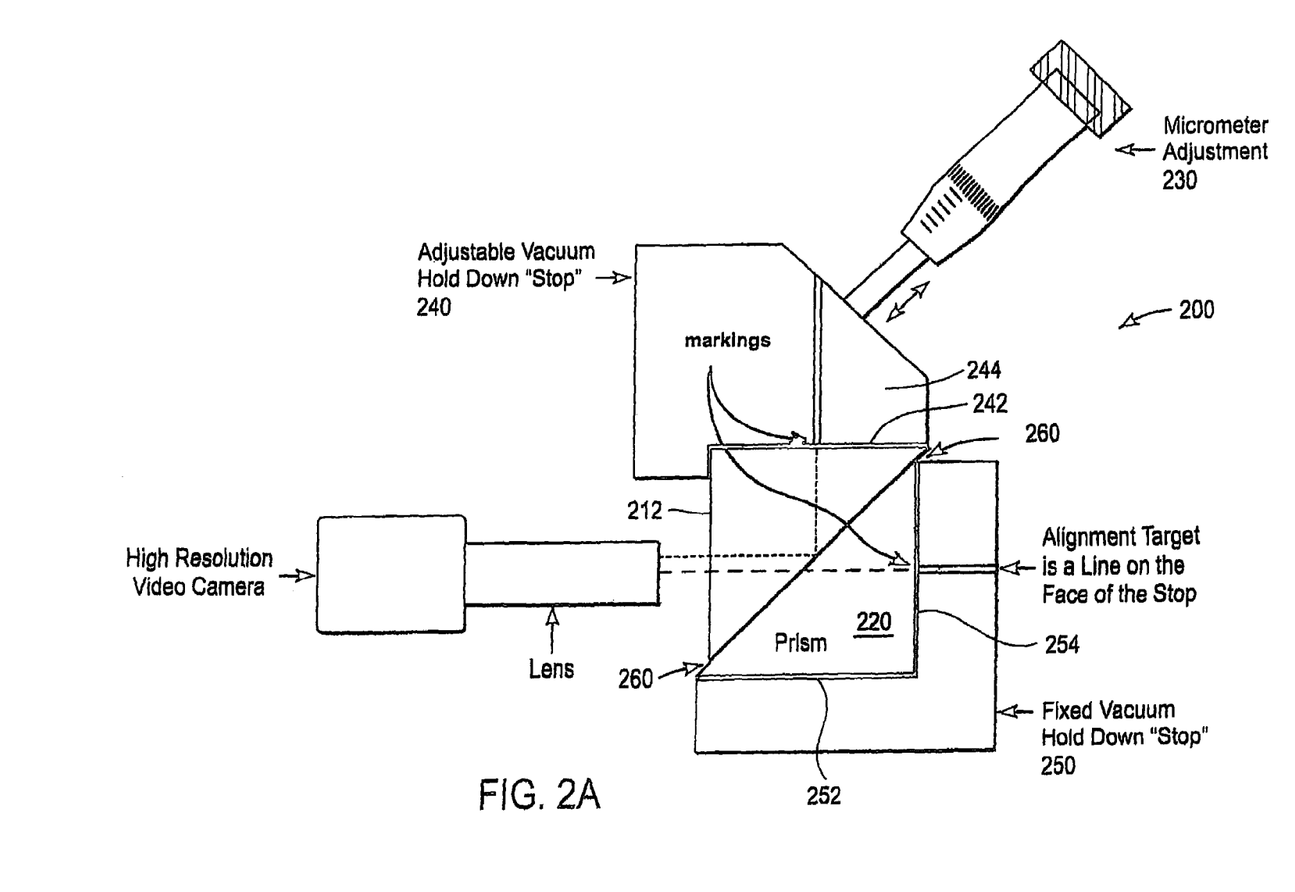
FIG. 2A is an illustration of a device used to produce a pathlength matched PBS cube according to an embodiment of the present invention.

Referring again to the drawings, wherein like reference numerals designate identical or corresponding parts, and more particularly to FIG. 2 thereof, there is illustrated a pathlength matching device 200 used to produce a pathlength matched PBS or beam splitting cube. A production process of a pathlength matched PBS cube is now described.

The pathlength matching device 200 is configured to hold two prisms (e.g., prism 210 and 220) and provide a fine adjustment (e.g. micrometer adjustment 230) for aligning or matching selected pathlengths through the two prisms. The two prisms (210 and 220) that will compose a PBS upon completion of the production process are positioned onto precision "stops" (240, 250) of the pathlength matching device 200. Using the terminology defined in FIG. 1, Face 1 (on the top prism 210) is attached to the adjustable stop 240 along side 242, and Face 2 (on the side of prism 220) is attached to the fixed stop 220 along side 252.

One method to achieve a firm but temporary attachment of the prisms to the stops is to use a vacuum hold down. For example, a vacuum chuck (not shown) is placed in at least one location on each stop and a vacuum line attached to the chucks provides suction that holds the prisms in place. However, other devices such as a clamp may be utilized. Thus the prisms are placed in position in corresponding stops of the pathlength matching device.

An adhesive (e.g., a UV curable adhesive) is dispensed to fill the gap between the top and bottom prism. On the face of each stop is a precisely located alignment target. The alignment target is a fine line (on the order of 10 microns). Stop 240 includes alignment target 244 and stop 250 includes alignment target 254. A high-resolution video camera "looks into" the as yet unassembled PBS through a Reference Face 212 of prism 210. Both alignment lines are observed through the video camera. Pathlength matching is achieved when the two alignment lines coincide. The lines can be made coincident by "sliding" the top prism along diagonal 260 between the top prism 210 and the bottom prism 220.

The amount of adjustment is performed by visually viewing and adjusting the prism assembly. With experience, an assembler will be able to estimate an amount of adjustment and dial that amount into the micrometer, and then perhaps make one or two smaller adjustments to position the prisms in a pathlength matched position. However, knowledge of a precise number to dial into the micrometer is not essential, and the pathlength matched positions can be reached simply by viewing and adjusting. Therefore, the micrometer 230 may be replaced by a fine adjustment screw or any device that can be configured to move the relative positions of the two prisms along their diagonals.

Also, note that the pathlength adjustment is fine tuned by sliding the prisms along their diagonals, and since the prisms are generally not of precisely the same dimensions, the prism corners will not perfectly align (note overhand at each end of the diagonals). In the finished pathlength matched beamsplitter (e.g., PBS), the amount of overhang is proportional to an amount of non-uniformity, or non-equality, in the dimensions of the prisms. With uniform prisms having equal dimensions, the prisms would mate together evenly, however, as noted above, such precision in prism construction is very costly. Thus, the present invention allows pathlength matched construction without the need for precisely sized prisms.

In the embodiment of FIG. 2, a micrometer 230 is utilized to adjust the position of the top prism and make the alignment lines coincide. In one embodiment, an operator watches an output of the video camera on a display screen and manually turns the micrometer adjustment until the alignment targets coincide. In another embodiment, the video camera feeds a computing device having vision system software that recognizes when the alignment targets are aligned. Computer generated signals inform an operator how much to adjust the micrometer, or the micrometer is adjusted by a stepping motor (or other control motor) as commanded by the vision system. In another embodiment, the video camera is replaced with an eyepiece in which the operator directly observes the alignment targets and then manually adjusts the micrometer 230.

Figure 2B:
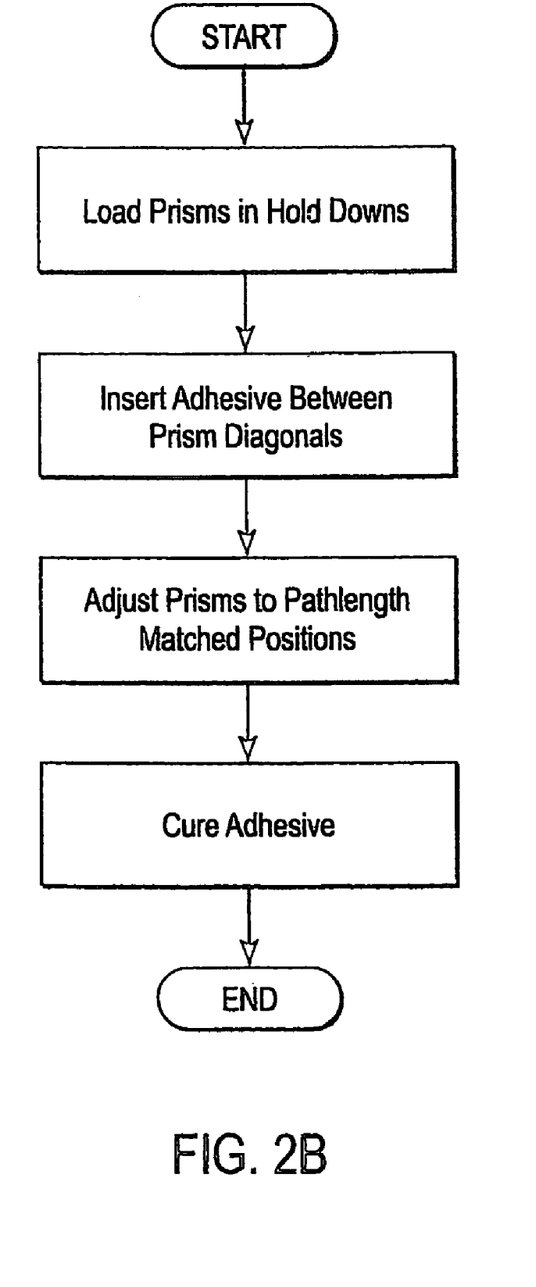
FIG. 2B is a flow chart of a process for producing a pathlength matched beamsplitter.

Finally, once alignment is satisfactory, a UV lamp is used to illuminate the PBS curing the adhesive and locking the components into place. An entire process for producing a pathlength matched beam splitting cube, using the device shown in FIG. 2A, is illustrated in FIG. 2B. To produce a Polarizing Beam Splitter (PBS) an additional step of applying a polarizing layer, thin film, to a diagonal of one of the prisms or between each of the diagonals of the prisms is added. Other types of beam splitters may be constructed by adding or substituting a different thin film (e.g., colorized beam splitter with the addition of a color layer).

Figure 3:
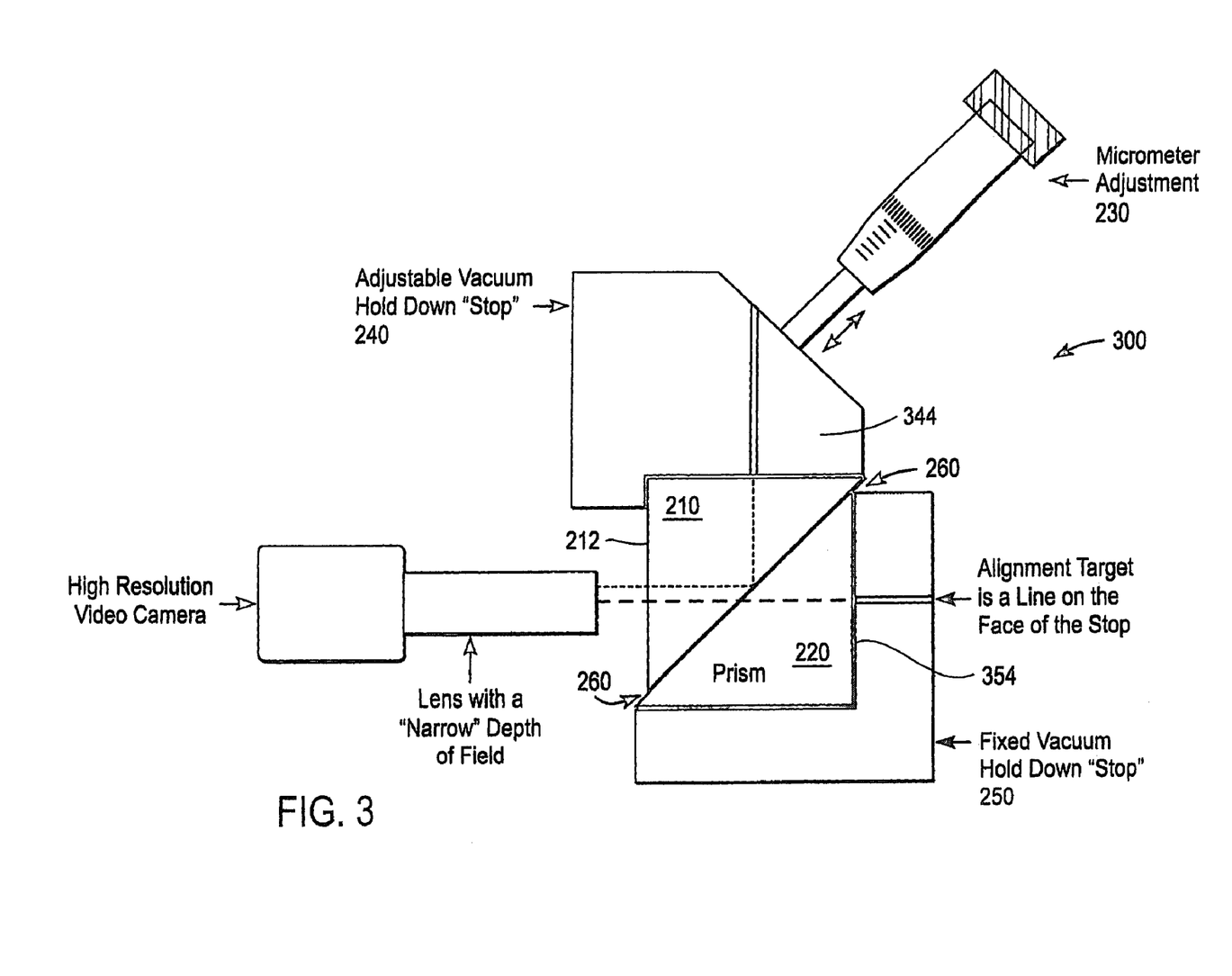
FIG. 3 is an illustration of a device used to produce a pathlength matched PBS cube according to another embodiment of the present invention.

A second method of production of a pathlength matched PBS cube is now described. FIG. 3 is an illustration of a device used to produce a pathlength matched PBS cube according to another embodiment of the present invention. Several features of the device in FIG. 3 are the same as the device in FIG. 2. The two prisms that will compose the PBS are held onto precision stops 240 and 250. Face 1 (on the top prism 210) is attached to the adjustable stop 240 and Face 2 (on the bottom prism 220) is attached to the fixed stop 250. Again, a vacuum hold down is used to achieve a firm but temporary attachment of the prisms to the stops. As before, an adhesive (probably an UV adhesive) is dispensed to fill a gap between the top and bottom prism along diagonal 260.

An alignment target is located on the face of each stop. In this embodiment, the location of the alignment target need not be precise. A high-resolution video camera "looks into" the as yet unassembled PBS through the Reference Face 212 (of the top prism 210). In this embodiment, the depth of field (DOF) of the video camera (as determine by the lens) is chosen to be very limited. The position of the top prism is adjusted by micrometer 230 until the video camera has both alignment targets simultaneously in focus. An equal distance (matched pathlength) from both alignment targets to the reference face (and video camera focal plane) is achieved when both alignment targets are in focus. DOF of the video camera is limited such that the alignment targets can only be simultaneously in focus when the prisms are arranged in a pathlength matched position within a tolerance needed for a product in which the PBS is to be used. As before, when alignment is satisfactory, the final step is to use a UV lamp to illuminate the PBS and cure the adhesive.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing an alignment target as a fine line, other targets, such as circles, cross hairs, etc, may be substituted. Also, any of the mechanical or optical components such as a micrometer, stops, video cameras, lenses, etc., may also be substituted with an equivalent device, or another device having an equivalent function or capability, whether or not listed herein. Furthermore, the inventors recognize that newly developed technologies not now known may also be substituted for the described parts and still not depart from the scope of the present invention.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Data used by the software may be retrieved from different sources (local or remote) and either permanently or temporarily stored (before, during, or after any processing) by utilizing any of text files, delimited files, database(s), or other storage techniques. Ultimately, such computer readable media further includes software for performing at least part of the present invention as described above.

Included in the programming (software) of the general/specialized computer or microprocessor are software modules for implementing the teachings of the present invention, including, but not limited to, recognition of alignment of alignment marks, sending adjustment signals that are any of printed or displayed, audible, or in command form sent to an adjustment micrometer, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A method of constructing a pathlength matched optical device, comprising the steps of:
   inserting an adhesive between at least two components of an optical device;
   adjusting positions of the components until their relative positions form a pathlength matched position; and
   curing the adhesive between the components while the components are held in the pathlength matched position wherein:
      the two components comprise a first prism and second prism abutted at diagonals of the prisms; and
      said step of adjusting comprises moving a position of the first prism relative to the second prism along the prism diagonals.

2. The method according to claim 1, wherein:
   each component comprises a prism; and
   said pathlength matched optical device is a beam splitting cube; and
   said step of inserting comprises inserting the adhesive between diagonals of the prisms.

3. The method according to claim 1, wherein:
   said step of adjusting positions of the components comprises,
   viewing two optical paths, a first of the optical paths passing through at least one part of a first of the components, and a second of the optical paths passing through at least one part of a second of the components; and
   adjusting the relative positions of the components until the two optical paths are coincident.

4. The method according to claim 3, wherein:
   the first optical path starts at an alignment target adjacent to a face of the first component and exits a reference face of the first component;
   the second optical path starts at an alignment target adjacent to a face of the second component and exits the reference face of the first component;
   said method further comprises the steps of,
   holding the first component in an adjustable precision holding device, and
   holding the second component in a fixed precision holding device;
   said step of adjusting comprises moving the adjustable precision holding device with a micrometer scale adjustment mechanism until the two optical paths are coincident; and
   said alignment targets are placed at precise matched positions on the adjustable and fixed precision holding devices.

5. The method according to claim 3, wherein:
   said step of viewing comprises,
   viewing the optical paths with a video camera, and
   displaying the optical paths on a video screen; and
   said step of adjusting the relative positions comprises adjusting the relative positions of the components until the two optical paths are coincident on the video screen.

6. The method according to claim 1, wherein:
   said step of adjusting positions of the components comprises,
   viewing two optical paths with an video camera,
   feeding signals from the video camera to a vision system that calculates a relative position adjustment of the components needed to make the optical paths coincident, and adjusting the relative positions of the components based on the calculated relative position adjustment.

7. The method according to claim 1, wherein:
said step of adjusting positions of the components comprises,
viewing two optical paths with a video camera,
feeding signals from the video camera to a vision system that produces a completion signal when the optical paths coincident, and
adjusting the relative positions of the components until the completion signal is produced.

8. The method according to claim 1, wherein,
said step of adjusting comprises,
viewing two optical paths with a limited field of view optical device; and
adjusting the relative positions of the components until markings at a start of each optical path are both simultaneously in focus.

9. The method according to claim 8, wherein:
said markings comprise starting points for each of pathlengths to be matched in the pathlength matched optical device; and
the limited field of view has a precision equal to a precision of the pathlength match required by the pathlength matched optical device.

10. The method according to claim 1, further comprising the step of installing the pathlength matched optical device in a video projection system.

11. The method according to claim 1, wherein at least one of the components is a triangular prism.

12. The method according to claim 1, wherein at least one of the components is a right angle triangular prism.

13. The method according to claim 1, wherein the pathlength matched position matches optical pathlengths of a first split beam exiting a first exit face of the optical device and a second split beam exiting a second exit face of the optical device.

14. The method according to claim 1, wherein the pathlength matched optical device has only a single internal reflection.

15. The method according to claim 1, wherein the pathlength matched optical device is installed in a video projection light management system.

16. A method, comprising the steps of:
selecting a first triangular prism comprising a first diagonal;
selecting a second triangular prism comprising a second diagonal;
abutting the triangular prisms at the diagonals in a beam splitting configuration; and
fixing the triangular prisms in beam splitter pathlength matched positions.

17. The method according to claim 16, wherein:
the first triangular prism and the second triangular prism are of approximately equivalent, but different, dimensions; and
the step of fixing the triangular prisms comprises overlapping ends of the diagonals by an amount proportional to a difference in dimensions between the first and second prisms.

18. The method according to claim 16, further comprising the step of installing the triangular prisms fixed in beamsplitter pathlength matched positions in a video projection light management system.

19. The method according to claim 16, wherein the first triangular prism and the second triangular prism are each right angle prisms.

20. The method according to claim 16, further comprising the step of depositing a beam splitting layer on one of the diagonals.

21. The method according to claim 20, wherein the beam splitting layer comprises at least one of a polarizing layer and a color separating layer.

22. The method according to claim 20, wherein:
the first prism further comprising an input face and a first output face;
the second prism further comprising a second output face; and
the beam splitting configuration facilitates direction of lightpaths through the beam splitter such that an input light beam input through the input face is split by the beam splitting layer into a first split beam and a second split beam and the first split beam exits the first output face and the second split beam exits the beamsplitter at the second output face.

23. The method according to claim 22, wherein the beam splitting configuration is arranged in a cube.

24. The method according to claim 16, wherein the pathlength matched beam splitting configuration comprises a cube.

25. The method according to claim 16, wherein the pathlength matched beam splitting configuration comprises a cube having an input face and two exit faces.

26. The method according to claim 16, wherein the beam splitting configuration comprises a beam splitting optical component having a single internal reflection.

27. The method according to claim 16, wherein the beam splitting configuration comprises a beam splitter that splits an incoming beam into two split beams oriented at 90 degrees relative to each other.

28. The method according to claim 16, wherein the triangular prisms in beamsplitter pathlength matched positions comprise a beamsplitter that produces a first split beam and a second split beam oriented at 90° with respect to each other.

29. The method according to claim 16, wherein the prisms are installed in a video projection light management system.

30. A method, comprising the steps of:
selecting a prism;
selecting an optical component;
depositing a beam splitting layer on a surface of at least one of the prism and the optical component;
abutting the prism to a side of the optical component at the beam splitting layer to form a beam splitter that splits an incoming light beam into a first spit beam and a second split beam;
adjusting the relative positions of the prism and the optical component until the first split beam and the second split beam are pathlength matched; and
setting the relative positions of the prism and the optical component in the beam splitter at the split beam pathlength matched position;
wherein the step of adjusting the relative positions of the prism and the optical component comprises overlapping ends of the abutted prism and the side of the optical component by an amount proportional to a difference in dimensions between the prism and the optical component.

31. The method according to claim 30, wherein the prism is a right angle prism.

32. The method according to claim 30, wherein the prism is a right angle prism and the optical component is a second right angle prism.

33. The method according to claim 30, wherein the prism is a first equilateral right angle prism, and the optical component is a second equilateral right angle prism.

34. The method according to claim 30, wherein the first split beam and the second split beam are at 90 degrees to each other.

35. The method according to claim 30, further comprising the step of installing the prism and optical component in a video projection light management system.

36. The method according to claim 30, wherein the optical component is a second prism, and the prisms are of approximately the same dimensions.

37. The method according to claim 30, wherein said step of adjusting is performed using:
   a first precision holding device configured to hold the prism and place a first alignment target adjacent to a face of the first prism;
   a second precision holding device configured to hold the optical input and to place a second alignment target adjacent to a face of the optical component;
   an adjustment device configured to adjust relative positions of the first and second holding devices; and
   an observation mechanism configured to observe a first light path originating at the first alignment target and a second light path originating at the second alignment target.

38. The method according to claim 30, further comprising the step of installing the prism and the optical component in a video projection light management system.

39. A method of constructing a pathlength matched optical device, comprising the steps of:
   inserting an adhesive between at least two components of an optical device;
   adjusting positions of the components until their relative positions form a pathlength matched position; and
   curing the adhesive between the components while the components are held in the pathlength matched position;
   wherein said step of adjusting comprises,
   viewing two optical paths with a limited field of view optical device; and
   adjusting the relative positions of the components until markings at a start of each optical path are both simultaneously in focus.

40. The method according to claim 39, wherein the limited field of view has a precision equal to a precision of the pathlength match required by the pathlength matched optical device.

41. The method according to claim 39, wherein the components are installed in a video projection light management system.

42. A method of constructing a pathlength matched optical device, comprising the steps of:
   inserting an adhesive between at least two components of an optical device;
   adjusting positions of the components until their relative positions form a pathlength matched position; and
   curing the adhesive between the components while the components are held in the pathlength matched position;
   wherein:
   said step of adjusting positions of the components comprises,
   viewing two optical paths, a first of the optical paths passing through at least one part of a first of the components, and a second of the optical paths passing through at least one part of a second of the components; and
   adjusting the relative positions of the components until the two optical paths are coincident;
   wherein:
   said step of viewing comprises,
   viewing the optical paths with a video camera, and
   displaying the optical paths on a video screen; and
   said step of adjusting the relative positions comprises adjusting the relative positions of the components until the two optical paths are coincident on the video screen.

43. The method according to claim 42, wherein the components are installed in a video projection light management system.

44. A method of constructing a pathlength matched optical device, comprising the steps of:
   inserting an adhesive between at least two components of an optical device;
   adjusting positions of the components until their relative positions form a pathlength matched position; and
   curing the adhesive between the components while the components are held in the pathlength matched position;
   wherein:
   said step of adjusting positions of the components comprises,
   viewing two optical paths with a video camera,
   feeding signals from the video camera to a vision system that calculates a relative position adjustment of the components needed to make the optical paths coincident, and
   adjusting the relative positions of the components based on the calculated relative position adjustment.

45. The method according to claim 44, wherein the components are installed in a video projection light management system.

46. A method of constructing a pathlength matched optical device, comprising the steps of:
   inserting an adhesive between at least two components of an optical device;
   adjusting positions of the components until their relative positions form a pathlength matched position; and
   curing the adhesive between the components while the components are held in the pathlength matched position;
   wherein:
   said step of adjusting positions of the components comprises,
   viewing two optical paths with a video camera,
   feeding signals from the video camera to a vision system that produces a completion signal when the optical paths coincident, and
   adjusting the relative positions of the components until the completion signal is produced.

47. The method according to claim 46, wherein the components are installed in a video projection light management system.

* * * * *